(12) United States Patent
Lewis et al.

(10) Patent No.: US 7,240,732 B2
(45) Date of Patent: Jul. 10, 2007

(54) DISPERSANT COMPOSITIONS FOR CEMENT COMPOSITIONS AND RELATED METHODS

(75) Inventors: Samuel J. Lewis, Duncan, OK (US); Michael J. Szymanski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/698,293

(22) Filed: Oct. 31, 2003

(65) Prior Publication Data

US 2005/0092211 A1 May 5, 2005

(51) Int. Cl.
*E21B 33/13* (2006.01)

(52) U.S. Cl. ............ 166/292; 166/293; 106/724; 106/727

(58) Field of Classification Search ........ 166/292, 166/293; 106/724, 727
See application file for complete search history.

(56) References Cited

U.S. PATENT DOCUMENTS

| | | | |
|---|---|---|---|
| 2,471,632 A * | 5/1949 | Ludwig | |
| 3,359,225 A | 12/1967 | Weisend | 260/29.6 |
| 3,615,784 A * | 10/1971 | Cattanach | 524/4 |
| 4,116,706 A * | 9/1978 | Previte | |
| 4,190,456 A * | 2/1980 | Absolon et al. | |
| 4,223,732 A * | 9/1980 | Carriay et al. | 166/291 |
| 4,522,653 A * | 6/1985 | Rao et al. | 166/293 |
| 4,557,763 A * | 12/1985 | George et al. | 166/293 |
| 4,676,317 A | 6/1987 | Fry et al. | 166/293 |
| 4,687,516 A * | 8/1987 | Burkhalter et al. | |
| 4,703,801 A | 11/1987 | Fry et al. | 166/293 |
| 4,818,288 A | 4/1989 | Aignesberger et al. | 106/90 |
| 4,871,395 A * | 10/1989 | Sugama | 106/678 |
| 5,110,839 A * | 5/1992 | Chao | 521/83 |
| 5,147,565 A * | 9/1992 | Bour et al. | 166/293 |
| 5,149,370 A | 9/1992 | Olaussen et al. | 106/737 |
| 5,252,128 A * | 10/1993 | Goaplkrishnan | 106/724 |
| 5,499,677 A * | 3/1996 | Cowan | 166/293 |
| 5,688,844 A * | 11/1997 | Chatterji et al. | 524/8 |
| 5,830,831 A * | 11/1998 | Chan et al. | 507/211 |
| 5,900,053 A | 5/1999 | Brothers et al. | 106/678 |
| 5,968,255 A * | 10/1999 | Mehta et al. | 106/724 |
| 5,972,103 A * | 10/1999 | Mehta et al. | 106/728 |
| 5,987,699 A * | 11/1999 | Nakamura et al. | 15/349 |
| 6,019,835 A | 2/2000 | Chatterji et al. | 106/725 |
| 6,063,738 A * | 5/2000 | Chatterji et al. | 507/269 |
| 6,090,754 A * | 7/2000 | Chan et al. | 507/110 |
| 6,143,069 A | 11/2000 | Brothers et al. | 106/678 |
| 6,170,575 B1 | 1/2001 | Reddy et al. | 166/293 |
| 6,182,758 B1 * | 2/2001 | Vijn | 166/293 |
| 6,235,809 B1 * | 5/2001 | DiLullo Arias et al. | 523/130 |
| 6,238,475 B1 | 5/2001 | Gargulak et al. | 106/725 |
| 6,245,142 B1 | 6/2001 | Reddy et al. | 106/724 |
| 6,297,202 B1 * | 10/2001 | Chatterji et al. | 507/261 |
| 6,297,295 B1 * | 10/2001 | Gay et al. | 523/130 |
| 6,332,921 B1 | 12/2001 | Brothers et al. | 106/692 |
| 6,367,550 B1 | 4/2002 | Chatterji et al. | 166/293 |
| 6,379,456 B1 | 4/2002 | Heathman et al. | 106/724 |
| 6,454,004 B2 * | 9/2002 | Reddy et al. | 166/293 |
| 6,478,869 B2 | 11/2002 | Reddy et al. | 106/724 |
| 6,494,951 B1 | 12/2002 | Reddy et al. | 106/705 |
| 6,547,871 B2 * | 4/2003 | Chatterji et al. | 106/672 |
| 6,589,661 B2 * | 7/2003 | Neely, Jr. | 428/457 |
| 6,610,139 B2 | 8/2003 | Reddy et al. | 106/724 |
| 6,619,399 B1 * | 9/2003 | Chatterji et al. | 166/293 |
| 6,630,021 B2 * | 10/2003 | Reddy et al. | 106/809 |
| 6,793,730 B2 * | 9/2004 | Reddy et al. | 106/677 |
| 2002/0050231 A1 | 5/2002 | Brothers et al. | 106/692 |

FOREIGN PATENT DOCUMENTS

| | | | |
|---|---|---|---|
| EP | 0 256 573 A | | 2/1988 |
| EP | 475568 | * | 3/1992 |
| EP | 1 069 091 A1 | | 1/2001 |
| EP | 1103533 | * | 5/2001 |
| EP | 1 153 898 A | | 11/2001 |
| JP | 03008749 | * | 1/1991 |

* cited by examiner

*Primary Examiner*—Paul Marcantoni
(74) *Attorney, Agent, or Firm*—Craig W. Roddy; Baker Botts, LLP

(57) ABSTRACT

The present invention relates to cementing operations, and more particularly to improved cement dispersants for cement compositions and methods of cementing. In one embodiment, the present invention provides a method of cementing comprising the steps of: providing a cement composition comprising a cement, and a dispersant composition, the dispersant composition comprising a surfactant and a hydrolyzed protein; placing the cement composition in a desired location; and allowing the cement composition to set.

57 Claims, No Drawings

DISPERSANT COMPOSITIONS FOR CEMENT COMPOSITIONS AND RELATED METHODS

BACKGROUND OF THE INVENTION

The present invention relates to cementing operations, and more particularly, to improved cement dispersants for cement compositions and methods of cementing.

Hydraulic cement compositions are commonly utilized in subterranean applications, including, but not limited to, well completion and remedial operations. For example, in subterranean well applications, hydraulic cement compositions are used in primary cementing operations whereby strings of pipe such as casing and liners are cemented in well bores. In performing primary cementing, a hydraulic cement composition is pumped into the annular space between the walls of a well bore and the exterior surface of the pipe string disposed therein. The cement composition is permitted to set in the annular space, thereby forming an annular sheath of hardened substantially impermeable cement therein that substantially supports and/or positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks in holes in pipe strings, and the like.

Dispersants are often used in cement compositions to obtain a desired set of rheological properties in and to facilitate mixing of the cement compositions. Adequately dispersed cement slurries generally exhibit improved fluid-loss control, can displace drilling mud more efficiently, and may be successfully mixed and pumped at higher densities with less frictional pressures. In addition, the lower viscosity often allows the cement slurries to be placed by turbulent flow. Turbulent flow characteristics are often desirable when pumping cement compositions into subterranean wells, as turbulent flow placement of cement may remove drilling fluids more efficiently from surfaces in the well bore. The inclusion of dispersants in cement compositions is also desirable in that the presence of the dispersants may facilitate the mixing of the compositions and reduce the requisite water. Reduced water content in cement compositions is often associated with improved compressive strength.

A number of dispersing agents have been utilized heretofore in cement compositions, particularly in cement compositions used for primary and remedial cementing in subterranean wells. Commonly these dispersants are sulfonic acid derivatives of aromatic or aliphatic hydrocarbons. One of the most common cement composition dispersants is a condensate of acetone, formaldehyde, and bisulfite. Such dispersants, however, may be problematic because of their possible adverse impact on the environment and failure to meet certain environmental regulatory requirements.

Other conventional dispersants that meet, or are exempt from, environmental regulations are available. These dispersants, however, have significant disadvantages. For example, lignosulfonate derived dispersants often retard cement setting, sometimes resulting in an overretardation of the cement composition. This problem is further amplified in cooler wells, such as those found in the North Sea. Set time retardation may also prolong the time spent waiting for the cement to set, contributing to increased operating costs. Additionally, lignosulfonate derived dispersants are a wood pulp by-product from the paper industry. As such, lignosulfonate derived dispersants suffer from quality control issues that stem from batch inconsistency.

SUMMARY OF THE INVENTION

The present invention relates to cementing operations, and more particularly to improved cement dispersants for cement compositions and methods of cementing.

In one embodiment, the present invention provides a method of cementing comprising the steps of: providing a cement composition comprising a cement, and a dispersant composition, the dispersant composition comprising a surfactant and a hydrolyzed protein; placing the cement composition in a desired location; and allowing the cement composition to set.

In one embodiment, the present invention provides a method of reducing the viscosity of a cement composition comprising the step of adding a dispersant composition comprising a surfactant and a hydrolyzed protein to the cement composition.

The features and advantages of the present invention will be readily apparent to those skilled in the art upon a reading of the description of the preferred embodiments that follows.

DESCRIPTION OF PREFERRED EMBODIMENTS

The present invention relates to cementing operations, and more particularly to improved cement dispersants for cement compositions and methods of cementing. More particularly, the present invention provides dispersant compositions suitable for use in the environment, as well as methods of cementing using cement compositions comprising these improved dispersant compositions. The cement compositions and dispersant compositions of the present invention may be utilized in any cementing application.

In one embodiment, the improved cement compositions of the present invention comprise a hydraulic cement, sufficient water to form a pumpable slurry, and a dispersant composition of the present invention in an amount effective to reduce the apparent viscosity of the cement composition to a desired extent prior to when it gels and sets. In certain embodiments, a dispersant composition of the present invention is included in a cement composition in the amount of from about 0.01% to about 6% by weight of cement in the cement composition. In other embodiments, the dispersant composition may be added in a range of from about 0.1% to 3% by weight of cement in the cement composition.

All cements suitable for use in subterranean cementing operations may be used in accordance with the present invention. Suitable examples include cements comprised of calcium, aluminum, silicon, oxygen, and/or sulfur, which set and harden by reaction with water. Such hydraulic cements, include, but are not limited to, Portland cements, pozzolana cements, gypsum cements, high alumina content cements, silica cements, and high alkalinity cements. Portland cements are generally preferred. In some embodiments, the Portland cements that are suited for use in the present invention are classified as Class A, C, H, and G cements according to American Petroleum Institute, *API Specification for Materials and Testing for Well Cements*, API Specification 10, Fifth Ed., Jul. 1, 1990. Another useful cement for certain embodiments of the present invention include a cement that is commercially available under the tradename "THERMALOCK™" from Halliburton Energy Services, Inc., in Duncan, Okla. The dispersants of the present invention also may be suitable for use with low-density cements. Such low-density cements may be foamed cements or may be cements comprising another means to reduce their density such as hollow microspheres, low-density elastic beads, or other density-reducing additives known in the art.

The water utilized in the cement compositions of this invention can be fresh water, salt water (e.g., water containing one or more salts dissolved therein), brine (e.g., saturated salt water), or seawater. Generally, the water can be from any source provided that it does not contain an excess of compounds that adversely affect other components in the cement composition. Preferably, the water is present in an amount sufficient to form a pumpable slurry. More particularly, the water is present in the cement compositions in an amount in the range of from about 16% to about 200% by weight of cement therein, more preferably in an amount of about 20% to about 110%.

An exemplary embodiment of the cement compositions of the present invention comprises a hydraulic cement, water present in an amount in the range of from about 30% to about 60% by weight of cement in the composition, and a dispersant composition of the present invention present in an amount in the range of from about 0.1% to about 6% by weight of cement in the composition.

As will be recognized by those skilled in the art, with the benefit of this disclosure, when the cement compositions of the present invention are utilized for primary or remedial subterranean well operations, such compositions also may include additional additives such as fluid loss additives, weighting agents, light weight materials, set retarders, accelerators, defoaming agents, foaming agents, friction reducing additives, and the like. If an accelerant is used, it is preferably calcium chloride. Also, if used, in certain embodiments, such accelerants are present in an amount in the range from about 1% to about 4% by weight of the cement in the compositions. Fluid loss additives such as hydroxyethylcellulose, carboxymethylcellulose, carboxymethylhydroxyethylcellulose, hydroxypropylcellulose, hydroxypropylguar, guar, polyvinylalcohol, synthetic polyelectrolytes, and the like are also suitable.

The dispersant compositions of the present invention comprise a surfactant and a co-surfactant. Optionally, the dispersant compositions also may comprise a defoamer. Any surfactant or co-surfactant hydrolyzed protein that is suitable for use in the environment is acceptable. More particularly, any surfactant or co-surfactant complying with certain environmental regulations that pertain to a chosen application is suitable.

To achieve certain beneficial effects of the present invention, the surfactant in the dispersant compositions of the present invention should be anionic. In certain exemplary embodiments, the anionic surfactant comprises a hydrolyzed protein or derivative thereof. Examples of suitable proteins include, but are not limited to, keratin, chitin, collagen, casein, rice protein, soy protein, wheat protein; or combinations thereof.

The co-surfactant in the dispersant compositions of the present invention is any suitable amphoteno surfactant that comprises a base coupled to an acid that has surface-active properties. In certain embodiments the co-surfactant is any suitable zwitterionic surfactant that comprises an internal salt, has an anion and a cation in one molecule chemically joined together, and that has surface-active properties. In certain embodiments the co-surfactant is a betaine. In certain exemplary embodiments the co-surfactant may include, but is not limited to, cocobetaine, cocoamidoethyl betaine, cocoamidopropyl betaine, lauryl betaine, lauramidopropyl betaine, palmamidopropyl betaine, stearamidopropyl betaine, stearyl betaine, lauryldimethyl betaine, cetyldimethyl betaine, hydrogenated cocoamidopropyl betaine, stripped coco(methyl ester)amidopropyl betaine, derivatives thereof, or combinations thereof.

In certain embodiments, the surfactants and the co-surfactant are included in the dispersant compositions of the present invention in an amount sufficient to form from about a ten to one ratio to about a one to ten ratio. In certain exemplary embodiments the surfactants and co-surfactants are included in the dispersant compositions of the present invention in an amount sufficient to form about a one-to-one ratio. Additionally, as will be recognized by those skilled in the art, with the benefit of this disclosure, the surfactant/co-surfactant ratio may be adjusted depending on the molarity of the surfactants and co-surfactant used.

The dispersants of the present invention can be used in a liquid or solid form, depending on the application. For example, a dispersant of the present invention, when in a powder form, may be blended with a dry cement prior to mixing with water. Such dry blends are generally preferred when the wells to be cemented are on land. In offshore applications, it is preferred that the dispersants are in a solution or suspension form. One having ordinary skill in the art, with the benefit of this disclosure, will recognize the appropriate form for a given application.

Optionally, the dispersant compositions of the present invention may contain various additives to enhance storage and transport characteristics. For example, the dispersant compositions may include a defoamer, a biocide, as well as organic phase stabilizers, anti-freeze agents, and salts. In one exemplary embodiment of the present invention, the dispersant compositions further comprise a defoamer. Any suitable defoamer compatible with the dispersant composition and cement to which the dispersant composition is added is suitable. Suitable defoamers include, but are not limited to, fatty acids, vegetable oils, polypropylene glycols, low hydrophile-lipophile balance (HLB) surfactants, rapeseed oil, aluminum stearate, "ENVIROGEM®" AE01 or AEO2 from Air Products and Chemicals, Inc., Leigh Valley, Pa., or combinations thereof. If used, the defoamer may be added in an amount sufficient to inhibit or prevent foaming of the dispersant composition. In certain exemplary embodiments, the defoamer may be added in an amount in the range of from about 0.01% to about 50% of the dispersant composition. One having ordinary skill in the art, with the benefit of this disclosure, will recognize the appropriate type and amount of defoamer that may be used in a particular application.

In one exemplary embodiment of the present invention, the dispersant compositions further comprise a biocide. Any suitable biocide, such as bactericides and/or microbiocides, for example, is appropriate. One having ordinary skill in the art, with the benefit of this disclosure, will recognize the appropriate type and amount of biocide that may be used in a particular application.

An exemplary embodiment of a dispersant composition of the present invention comprises about 27% hydrolyzed keratin, about 13% rapeseed oil, about 1% aluminum stearate, about 0.5% sorbitan palmitate, about 1.5% monopropyleneglycol monooleate, about 14% cocoamidopropylbetaine, about 1.5% sodium chloride, and about 42% water. Another exemplary embodiment of a dispersant composition of the present invention comprises about 27% hydrolyzed keratin, about 0.5% sorbitan palmitate, about 14% cocoamidopropylbetaine, about 1.5% sodium chloride, and 58% water.

An embodiment of the present invention provides a method of cementing comprising the steps of: providing a cement composition comprising a cement, and a dispersant composition, the dispersant composition comprising a surfactant and a hydrolyzed protein; placing the cement composition in a desired location; and allowing the cement composition to set.

Another embodiment of the present invention provides a method of reducing the viscosity of a cement composition comprising the steps of adding a dispersant composition comprising a surfactant and a hydrolyzed protein to the cement composition.

To facilitate a better understanding of the present invention, the following examples of exemplary embodiments are given. In no way should such examples be read to limit the scope of the invention.

EXAMPLES

To examine the effect of an exemplary dispersant composition on the rheology of typical cement slurries, a test cement composition was prepared (Table 1). A Standard Grade Class G hydraulic cement from Dyckerhoff A G, Wiesbaden, Germany, was mixed with a sufficient amount of fresh water to form a pumpable slurry. Cement composition test samples contained a conventional dispersant, specifically either the condensate of acetone, formaldehyde, and bisulfite or a lignosulfonate derivative. The other test sample was the same, except the dispersant used was a dispersant composition of the present invention as described in Table 1. Two volumes of the dispersants were tested, 4 mL and 8 mL, at two temperatures, 80° F. and 180° F. Cements were monitored to determine the thickening time. In addition, both the yield point ("YP") and plastic viscosity ("PV") were measured and recorded.

TABLE 1

Exemplary Dispersant Composition

| Component | Percent (%) |
| --- | --- |
| Hydrolyzed Keratin | 26.7 |
| Rapeseed Oil | 13.1 |
| Aluminium Stearate | 0.8 |
| Sorbitan Palmitate | 0.5 |
| Monopropyleneglycol Monooleate | 1.3 |
| Cocoamidopropylbetaine | 13.9 |
| Sodium Chloride | 1.5 |
| Water | 42.2 |
| Total | 100 |

TABLE 2

Comparison of Dispersants in Class G Cement[1]

| Additive | Rheology at 80° F. (YP/PV)[2] | Rheology at 180° F. (YP/PV) | Thickening Time (hr) |
| --- | --- | --- | --- |
| 4 mL condensate of acetone, formaldehyde, and bisulfite | 3.7/144.8 | 4.9/75.1 | ~4 |
| 4 mL lignosulfonate derivative | 2.7/218.5 | 7.6/88.0 | ~4 |
| 4 mL dispersant composition | 4.0/181.1 | 3.9/98.2 | ~4 |
| 8 mL condensate of acetone, formaldehyde, and bisulfite | 3.9/128.3 | 4.5/61.9 | Not Determined |
| 8 mL lignosulfonate derivative | 2.4/145.5 | 4.3/95.4 | Not Determined |
| 8 mL dispersant composition | 3.4/159.4 | 4.0/83.6 | Not Determined |

[1]The cement slurry included 0.5% bwoc of a cement retarder commercially available under the tradename "HR ®-5L" from Halliburton Energy Services, Inc., in Duncan, Oklahoma to prevent premature gelation of the slurry
[2]YP = yield point (Pa); PV = plastic viscosity (cp)

Table 2 lists the rheological characteristics of an exemplary dispersant of the present invention, and indicates that the present system performs better than lignosulfonate derived dispersants in most cases while giving slightly higher values for PV/YP than condensates of acetone, formaldehyde, and bisulfite dispersants. Moreover, the present system demonstrates less of a retarding effect than lignosulfonate derived dispersants as demonstrated by the thickening times shown.

To examine the effect of the exemplary dispersant composition of the present invention described in Table 1 on the rheology of typical cement slurries, a model cement composition was prepared. The cement composition was prepared by mixing 1000 g of a Standard Grade Class H hydraulic cement from LaFarge North America, Grand Chain, Ill., with 320 g of fresh water (32% water). The water was measured in a Waring blender and the liquid dispersant samples were weighed into the blender jar. The liquid dispersants included the exemplary dispersant composition of Table 1 and conventional dispersants, specifically either a condensate of acetone, formaldehyde, and bisulfite or a lignosulfonate derivative. The liquids were mixed for several seconds when the dry blend was added according to API specifications. All tests were performed according to API methodologies. Three volumes of the dispersant compositions were tested, 4 mL and 8 mL, and 12 mL at two temperatures, 80° F. and 180° F. Cements were monitored to determine the thickening time and both the yield point ("YP") and plastic viscosity ("PV") were measured and recorded.

TABLE 3

Comparison of Dispersants in Class H Cement

| Additive[1] | Rheology at 80° F. | | Rheology at 180° F. | |
| --- | --- | --- | --- | --- |
| | PV (cp) | YP (Pa) | PV (cp) | YP (Pa) |
| 4 mL dispersant composition | 117.7 | 9.2 | 174.5 | 11.7 |
| 8 mL dispersant composition | 76.4 | 6.5 | 79.4 | 6.2 |
| 12 mL dispersant composition | 48.7 | 7.1 | 52.2 | 7.2 |
| 12 mL water | 155.9 | 11.5 | 275.5 | 12.7 |
| 4 mL condensate of acetone, formaldehyde, and bisulfite | 110.8 | 9.8 | 197.3 | 9.3 |
| 8 mL condensate of acetone, formaldehyde, and bisulfite | 46.7 | 4.1 | 44.9 | 7.8 |
| 4 mL lignosulfonate derivative | 93.2 | 12 | 125.4 | 17 |

TABLE 3-continued

Comparison of Dispersants in Class H Cement

| Additive[1] | Rheology at 80° F. | | Rheology at 180° F. | |
| --- | --- | --- | --- | --- |
| | PV (cp) | YP (Pa) | PV (cp) | YP (Pa) |
| 8 mL lignosulfonate derivative | 78.7 | 0 | 46.1 | 10.1 |

[1]The 12 mL volume was not used for condensate of acetone, formaldehyde, and bisulfite dispersant or the lignosulfonate derived dispersant due to low yield point value and cement settling.

Table 3 lists some rheological characteristics of a dispersant of the present invention, and indicates that the present system effectively disperses cement slurries as compared to lignosulfonate derived and condensate of acetone, formaldehyde, and bisulfite dispersants.

To examine the effect of an exemplary dispersant composition of the present invention on the rheology of typical cement slurries under North Sea conditions, a model cement composition was prepared and tested. The dispersant composition of the present invention included an optional defoamer. North Sea well conditions were modeled using a bottom hole circulating temperature of 122° F. and pressure of 6,000 psi, both achieved with a ramp time of 60 minutes. The cement composition was prepared by mixing a Standard Grade Class G hydraulic cement from Norcem, Oslo, Norway with the components listed in Table 4. The cement was mixed with the following additives: a gas control agent commercially available under the tradename "GASCON™-469" from Halliburton Energy Services, Inc., in Duncan, Okla.; low water loss additives commercially available under the tradename "HALAD®-613" and "HALAD®-600" from Halliburton Energy Services, Inc., in Duncan, Okla.; a cement retarder commercially available under the tradename "HR®-5L" from Halliburton Energy Services, Inc., in Duncan, Okla.; a defoamer commercially available under the tradename "NF™-6" from Halliburton Energy Services, Inc., in Duncan, Okla.; a cement flow enhancer commercially available under the tradename "EZ-FLO™" from Halliburton Energy Services, Inc., in Duncan, Okla. The cement and "EZ-FLO™" were dry blended in a jar. The water was measured in a Waring blender and the additives were weighed into the blender jar. The liquids included the exemplary dispersant composition of Table 1 or a conventional dispersant, specifically either a condensate of acetone, formaldehyde, and bisulfite or a lignosulfonate derivative were mixed for several seconds. The dry blend was then added to the liquids and mixed according to API specifications. All tests were performed according to API methodologies. Cements were monitored to determine the thickening time and both the yield point ("YP") and plastic viscosity ("PV") were measured and recorded.

TABLE 4

Type G Cement Composition

| Component | Percent (%) | Grams (g) |
| --- | --- | --- |
| Norcem Type G cement | 100 | 1200 |
| Water | 41.9 | 502.7 |
| "GASCON ™-469" | 5 | 59.4 |
| "HR ®-5L" | 1.1 | 13.1 |
| Dispersant | 2.3 | 27.4 |

TABLE 4-continued

Type G Cement Composition

| Component | Percent (%) | Grams (g) |
| --- | --- | --- |
| "HALAD ®-613" and "HALAD ®-600" | 5.5 | 65.8 |
| "NF ™-6" | 0.2 | 2.2 |
| "HALAD ®-600" | 2.2 | 26.3 |
| "EZ-FLO ™" | 0.1 | 1.2 |

TABLE 5

Comparison of Dispersants Under North Sea Well Conditions

| Dispersant | PV[1] (cp) | YP[2] (Pa) | Thickening Time (hr) |
| --- | --- | --- | --- |
| dispersant composition with defoamer | 32.8 | 1.4 | 7.5 |
| condensate of acetone, formaldehyde, and bisulfite | 45.4 | 0 | 7.5 |
| lignosulfonate derivative | 48.1 | 0 | 9 |

[1]PV = plastic viscosity
[2]YP = yield point

Table 5 lists some rheological characteristics of a dispersant of the present invention with an optional defoamer compared to conventional dispersants. Table 5 indicates that the present system effectively disperses cement as compared to lignosulfonate derived and condensate of acetone, formaldehyde, and bisulfite dispersants under the cooler well conditions found in the North Sea.

Thus, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of cementing comprising the steps of:
providing a cement composition comprising a cement, and a dispersant composition, the dispersant composition comprising a surfactant, a hydrolyzed protein, and a defoamer, wherein the defoamer is present in an amount sufficient to prevent foaming of the dispersant composition;
allowing the dispersant composition to disperse at least some of the cement composition;
placing the cement composition in a subterranean formation that has been penetrated by a well bore; and
allowing the cement composition to set therein.

2. The method of claim 1 wherein the hydrolyzed protein comprises at least one of the following: a hydrolyzed chitin, a hydrolyzed collagen, a hydrolyzed casein, a hydrolyzed rice protein, a hydrolyzed soy protein, a hydrolyzed wheat protein, or a combination thereof.

3. The method of claim 1 wherein the surfactant comprises at least one of the following: an amphoteric surfactant, a zwitterionic surfactant, or a combination thereof.

4. The method of claim 1 wherein the surfactant comprises a betaine.

5. The method of claim 1 wherein the surfactant comprises a cocobetaine.

6. The method of claim 1 wherein the surfactant comprises at least one of the following: a cocoamidoethyl betaine, a cocoamidopropyl betaine, a lauryl betaine, a lauramidopropyl betaine, a palmamidopropyl betaine, a stearamidopropyl betaine, a stearyl betaine, a lauryldimethyl betaine, a cetyldimethyl betaine, a hydrogenated cocoamidopropyl betaine, a stripped coco(methyl ester)amidopropyl betaine, a derivative thereof, or a combination thereof.

7. The method of claim 1 wherein the hydrolyzed protein and surfactant are present in the range of from about a one to ten ratio to about a ten to one ratio of hydrolyzed protein to surfactant.

8. The method of claim 1 wherein the hydrolyzed protein and surfactant are present in about a one to one ratio.

9. The method of claim 1 wherein the dispersant composition is a solid, a liquid, an emulsion, or a mixture thereof.

10. The method of claim 1 wherein the defoamer comprises at least one of the following: a fatty acid, a vegetable oil, a polypropylene glycol, a low hydrophile-lipophile balance surfactant, or a combination thereof.

11. The method of claim 1 wherein the defoamer comprises at least one of the following: rapeseed oil, aluminum stearate, or a combination thereof.

12. The method of claim 1 wherein the defoamer is present in the dispersant composition in the range of from about 0.01% to about 50% by volume of the dispersant composition.

13. The method of claim 1 wherein the dispersant composition further comprises a biocide.

14. The method of claim 1 wherein the dispersant composition is present in the cement composition in an amount sufficient to reduce the apparent viscosity of the cement composition prior to setting.

15. The method of claim 1 wherein the dispersant composition is present in the cement composition in an amount of from about 0.01% to about 6% by weight of cement.

16. The method of claim 1 wherein the cement is a hydraulic cement.

17. The method of claim 16 wherein the hydraulic cement comprises at least one of the following: calcium, aluminum, silicon, oxygen, sulfur, or a combination thereof.

18. The method of claim 16 wherein the hydraulic cement comprises at least one of the following: a Class A, a Class C, a Class H, or a Class G cement.

19. The method of claim 1 wherein the cement is a low-density cement.

20. The method of claim 1 wherein the cement composition further comprises water that is present in an amount sufficient to allow the cement composition to be a pumpable slurry.

21. The method of claim 20 wherein the water comprises fresh water, salt water, or brine.

22. The method of claim 1 wherein the water component is present in an amount in the range of from about 16% to about 200% by weight of the cement in the cement composition.

23. The method of claim 20 wherein the cement is a hydraulic cement, the water component is present in an amount from about 16% to about 200% by weight of the cement in the cement composition, and the dispersant composition is present in an amount in the range of from about 0.01% to about 6% by weight of the cement in the cement composition.

24. The method of claim 1 wherein the cement composition further comprises at least one of the following: a fluid loss additive, a weighting material, a light weight material, a set retarder, an accelerator, a foaming agent, or a combination thereof.

25. A method of dispersing a cement composition comprising:

adding to the cement composition a dispersant composition comprising a surfactant, a hydrolyzed protein, and a defoamer, wherein the defoamer is present in an amount sufficient to prevent foaming of the dispersant composition; and;

allowing the dispersant composition to disperse at least some of the cement composition;

placing the cement composition in a subterranean formation that has been penetrated by a well bore; and allowing the cement composition to set therein.

26. The method of claim 25 wherein the hydrolyzed protein comprises at least one of the following: a hydrolyzed chitin, a hydrolyzed collagen, a hydrolyzed casein, a hydrolyzed rice protein, a hydrolyzed soy protein, a hydrolyzed wheat protein, or any combination thereof.

27. The method of claim 25 wherein the surfactant comprises at least one of the following: an amphoteric surfactant, a zwitterionic surfactant, or a combination thereof.

28. The method of claim 25 wherein the surfactant comprises a betaine.

29. The method of claim 25 wherein the surfactant comprises a cocobetaine.

30. The method of claim 25 wherein the surfactant comprises at least one of the following: a cocoamidoethyl betaine, a cocoamidopropyl betaine, a lauryl betaine, a lauramidopropyl betaine, a palmamidopropyl betaine, a stearamidopropyl betaine, a stearyl betaine, a lauryldimethyl betaine, a cetyldimethyl betaine, a hydrogenated cocoamidopropyl betaine, a stripped coco(methyl ester)amidopropyl betaine, a derivative thereof, or combinations thereof.

31. The method of claim 25 wherein the dispersant composition is present in the cement composition in an amount sufficient to reduce the apparent viscosity of the cement composition.

32. The method of claim 25 wherein the dispersant composition is present in the cement composition in an amount of from about 0.01% to about 6% by weight of cement.

33. The method of claim 1 wherein the step of placing the cement composition in the subterranean formation consists of placing the cement composition in an annular space between the walls of a well bore and an exterior surface of a pipe string disposed in the well bore.

34. The method of claim 1 further comprising the step of:
providing the dispersant composition; and
mixing the dispersant composition and the cement to form the cement composition.

35. The method of claim 1 wherein the cement composition comprises water in an amount sufficient to form a pumpable slurry and a dispersant in an amount sufficient to reduce the apparent viscosity of the cement composition.

36. A method of cementing in a subterranean formation comprising:

providing a cement composition comprising water in an amount sufficient to form a pumpable slurry, a hydraulic cement, and a dispersant composition in an amount effective to reduce the apparent viscosity of the cement composition, the dispersant composition comprising a surfactant, a hydrolyzed protein, and a defoamer, wherein the defoamer is present in an amount sufficient to prevent foaming of the dispersant composition;

allowing the dispersant composition to reduce the apparent viscosity of the cement composition;

introducing the cement into a subterranean formation that has been penetrated by a well bore; and allowing the cement composition to set therein.

37. The method of claim 36 wherein the hydrolyzed protein comprises at least one of the following: a hydrolyzed chitin, a hydrolyzed collagen, a hydrolyzed casein, a hydrolyzed rice protein, a hydrolyzed soy protein, a hydrolyzed wheat protein, or a combination thereof.

38. The method of claim 36 wherein the surfactant comprises at least one of the following: an amphoteric surfactant, a zwitterionic surfactant, or a combination thereof.

39. The method of claim 36 wherein the surfactant comprises a betaine.

40. The method of claim 36 wherein the surfactant comprises a cocobetaine.

41. The method of claim 36 wherein the surfactant comprises at least one of the following: a cocoamidoethyl betaine, a cocoamidopropyl betaine, a lauryl betaine, a lauramidopropyl betaine, a palmamidopropyl betaine, a stearamidopropyl betaine, a stearyl bctaine, a lauryldimethyl betaine, a cetyldimethyl betaine, a hydrogenated cocoamidopropyl betaine, a stripped coco(methyl ester)amidopropyl betaine, a derivative thereof, or a combination thereof.

42. The method of claim 36 wherein the hydrolyzed protein and surfactant are present in the range of from about a one to ten ratio to about a ten to one ratio of hydrolyzed protein to surfactant.

43. The method of claim 36 wherein the hydrolyzed protein and surfactant are present in about a one to one ratio.

44. The method of claim 36 wherein the dispersant composition is a solid, a liquid, an emulsion, or a mixture thereof.

45. The method of claim 36 wherein the defoamer comprises at least one of the following: a fatty acid, a vegetable oil, a polypropylene glycol, a low hydrophile-lipophile balance surfactant, or a combination thereof.

46. The method of claim 36 wherein the defoamer comprises at least one of the following: rapeseed oil, aluminum stearate, or a combination thereof.

47. The method of claim 36 wherein the defoamer is present in the dispersant composition in the range of from about 0.01% to about 50% by volume of the dispersant composition.

48. The method of claim 36 wherein the dispersant composition further comprises a biocide.

49. The method of claim 36 wherein the dispersant composition is present in the cement composition in an amount sufficient to reduce the apparent viscosity of the cement composition prior to setting.

50. The method of claim 36 wherein the dispersant composition is present in the cement composition in an amount of from about 0.01% to about 6% by weight of cement.

51. The method of claim 36 wherein the hydraulic cement comprises at least one of the following: calcium, aluminum, silicon, oxygen, sulfur, or a combination thereof.

52. The method of claim 36 wherein the hydraulic cement comprises at least one of the following: a Class A, a Class C, a Class H, or a Class G cement.

53. The method of claim 36 wherein the cement is a low-density cement.

54. The method of claim 36 wherein the water comprises fresh water, salt water, or brine.

55. The method of claim 36 wherein the water component is present in an amount in the range of from about 16% to about 200% by weight of the cement in the cement composition.

56. The method of claim 36 wherein the water is present in an amount from about 16% to about 200% by weight of the cement in the cement composition, and the dispersant composition is present in an amount in the range of from about 0.01% to about 6% by weight of the cement in the cement composition.

57. The method of claim 36 wherein the cement composition further comprises at least one of the following: a fluid loss additive, a weighting material, a light weight material, a set retarder, an accelerator, a foaming agent, or a combination thereof.

* * * * *